(12) United States Patent
MacLachlan et al.

(10) Patent No.: US 8,496,105 B2
(45) Date of Patent: Jul. 30, 2013

(54) ROLLER-TOP BELT WITH BEAM STIFFNESS

(75) Inventors: Gilbert J. MacLachlan, Harahan, LA (US); David C. Weiser, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 136 days.

(21) Appl. No.: 13/113,538

(22) Filed: May 23, 2011

(65) Prior Publication Data
US 2012/0298486 A1 Nov. 29, 2012

(51) Int. Cl.
*B65G 17/06* (2006.01)

(52) U.S. Cl.
USPC .......................... 198/853; 198/851

(58) Field of Classification Search
USPC .................. 198/779, 850, 851, 853
See application file for complete search history.

(56) References Cited

U.S. PATENT DOCUMENTS

| | | | | |
|---|---|---|---|---|
| 1,201,748 | A * | 10/1916 | Luce | 474/156 |
| 3,118,529 | A * | 1/1964 | Rubner | 193/37 |
| 3,870,141 | A | 3/1975 | Lapeyre et al. | |
| 4,832,183 | A | 5/1989 | Lapeyre | |
| 4,993,540 | A | 2/1991 | van Capelleveen | |
| 5,170,883 | A * | 12/1992 | Ledet et al. | 198/834 |
| 5,263,575 | A * | 11/1993 | Ledet | 198/834 |
| 5,316,522 | A * | 5/1994 | Carbone et al. | 474/95 |
| 5,427,580 | A * | 6/1995 | Ledvina et al. | 474/84 |
| 6,367,616 | B1 * | 4/2002 | Lapeyre et al. | 198/779 |
| 6,494,312 | B2 | 12/2002 | Costanzo | |
| 6,766,899 | B1 * | 7/2004 | Guldenfels | 198/834 |
| 6,874,617 | B1 | 4/2005 | Layne | |
| 6,932,211 | B2 * | 8/2005 | Wieting et al. | 198/853 |
| 6,997,306 | B2 * | 2/2006 | Sofranec et al. | 198/779 |
| 7,137,505 | B2 * | 11/2006 | Stebnicki et al. | 198/850 |
| 7,216,759 | B2 * | 5/2007 | Rau et al. | 198/853 |
| 7,246,700 | B2 * | 7/2007 | Stebnicki et al. | 198/853 |
| 7,331,448 | B2 * | 2/2008 | Stebnicki et al. | 198/853 |
| 7,527,143 | B2 * | 5/2009 | Krisl et al. | 198/779 |
| 7,540,368 | B2 | 6/2009 | Weiser | |
| 7,563,188 | B2 * | 7/2009 | Ozaki et al. | 474/206 |
| 7,886,892 | B2 | 2/2011 | Fourney | |
| 7,997,404 | B2 * | 8/2011 | Krisl et al. | 198/779 |
| 2005/0269189 | A1 * | 12/2005 | Rau et al. | 198/779 |
| 2006/0011454 | A1 * | 1/2006 | Stebnicki et al. | 198/779 |
| 2006/0070856 | A1 * | 4/2006 | Stebnicki et al. | 198/779 |
| 2006/0237291 | A1 * | 10/2006 | Ozaki et al. | 198/853 |
| 2007/0221481 | A1 * | 9/2007 | Stebnicki et al. | 198/779 |
| 2008/0105518 | A1 * | 5/2008 | Krisl et al. | 198/853 |
| 2009/0250321 | A1 * | 10/2009 | Krisl et al. | 198/779 |

* cited by examiner

*Primary Examiner* — Gene Crawford
*Assistant Examiner* — Keith R Campbell
(74) *Attorney, Agent, or Firm* — James T. Cronvich

(57) ABSTRACT

A modular roller-top conveyor belt and multi-piece rollers for the belt. The roller-top belt has axles unitarily molded with the belt modules. Each of the pieces of the multi-piece rollers can be installed radially onto an axle and joined together in a puzzle pattern to form a complete roller that can rotate on the axle. Parallel ridges extending across the width of the modules add stiffness to the belt.

29 Claims, 4 Drawing Sheets

ROLLER-TOP BELT WITH BEAM STIFFNESS

BACKGROUND

The invention relates generally to power-driven conveyors and more particularly to modular plastic conveyor belts with article-supporting rollers.

Article-supporting rollers are used in modular plastic conveyor belts to provide low-friction rolling support to conveyed articles. In many roller-top belts, the rollers are mounted on steel axles in cavities formed in the belt modules used to construct the modular belt. Because of the presence of the cavities, the plastic modules are less stiff than they would be without the cavities. Wide roller-top belts with many cavities require more underlying support area, e.g., more wearstrips, across the width of the conveyor. More wearstrips can mean higher costs in materials and construction, more friction between the belt and the wearstrips, and increased obstruction to air flow through the belt. Thus, there is a need to minimize the support surface area required to support roller-top belts across their widths.

Roller-top belt modules with steel axles are more difficult to manufacture than standard modules without rollers. One way to manufacture a roller-top module is to injection-mold the module around a roller on a steel axle. The ends of the axle extend into the mold and are encapsulated in the molded module body. Another way is to injection-mold a module body with a receptacle for a roller. Then, in a secondary manufacturing step, a roller and axle are placed in each receptacle, and a cover is welded or otherwise retained in place over the ends of the axle to hold the roller in the module. Thus, there is a need to simplify the manufacture of roller-top belts.

SUMMARY

These needs and others are addressed by a conveyor belt module embodying features of the invention and a conveyor belt constructed of a series of rows of one or more of the modules linked together at hinge joints formed by interleaved hinge elements between adjacent belt rows. An intermediate portion of the conveyor belt module has a first end and an opposite second end that define the length of the intermediate portion, a top side and an opposite bottom side that define the thickness, and a first edge and an opposite second edge that define the width. Hinge elements of a first set are spaced apart across first gaps along the first end of the intermediate portion. Hinge elements of a second set are spaced apart across second gaps along the second end. At least one cavity bounded by a wall opens onto the top side of the intermediate portion. An axle extending across the cavity is unitarily molded with the intermediate portion. Opposite ends of the axle are molded at opposite positions on the wall. A roller has a bore receiving the axle, on which the roller rotates.

Another aspect of the invention provides the conveyor belt module embodying features of the invention and a modular conveyor belt constructed of rows of those modules. The modules comprise an intermediate portion that has a first end and an opposite second end that define the length of the intermediate portion, a top side and an opposite bottom side that define the thickness, and the first edge and an opposite second edge that define the width. Hinge elements of a first set are spaced apart across first gaps along the first end of the intermediate portion. Hinge elements of a second set are spaced apart across second gaps along the second end. At least one cavity bounded by a wall opens onto the top side of the intermediate portion. A first ridge extends upward from the top surface along the first end of the intermediate portion between the first and second edges. The height of the first ridge above the top surface varies across the width of the intermediate portion.

BRIEF DESCRIPTION OF THE DRAWINGS

These aspects and features of the invention, as well as its advantages, are described in more detail in the following description, appended claims, and accompanying drawings, in which:

DETAILED DESCRIPTION

Figure 1:
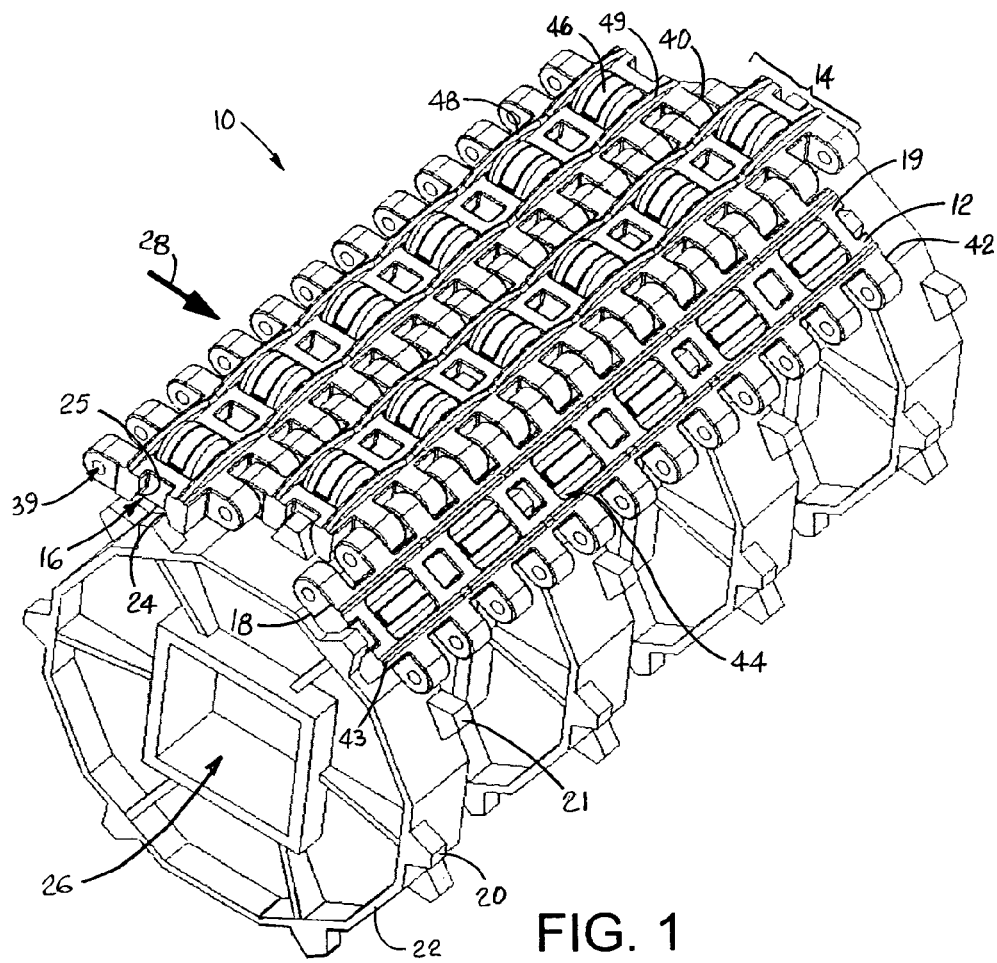
FIG. 1 is an isometric view of a portion of a modular plastic conveyor belt embodying features of the invention.

A portion of a conveyor belt embodying features of the invention is shown in FIG. 1. The portion of the modular conveyor belt 10 shown is an interior portion. Three conveyor belt modules 12 are connected together in three belt rows 14. The modules are shown offset laterally from row to row in a bricklay pattern. Although only one module 12 is shown in each row 14, other similar modules are connected side by side in each row to form an endless conveyor belt. Drive pockets 16 opening onto bottom sides 18 of the modules admit teeth 20, 21 of drive or idle sprockets 22. The teeth 20, 21 of drive sprockets drive against leading drive surfaces 24 bounding the pockets. The teeth 20, 21 of idle sprockets are driven by trailing drive surfaces 25 bounding the pockets opposite the leading drive surfaces. The teeth are arranged in two groups around the periphery of each of the sprockets. Each group is laterally offset from the other across the width of the sprocket. The teeth 20 in a first group are staggered circumferentially from the teeth 21 in a second group, with the teeth in each group spaced at twice the pitch of the conveyor belt. In this way, the teeth are positioned to engage the drive pockets 16, which are laterally offset from row to row. The teeth 20 in the first group engage all the even rows, and the teeth 21 in the second group engage all the odd rows. The endless belt is trained around idle and drive sprocket sets, which are mounted on shafts (not shown) received in bores 26 of the sprockets. The shaft of the drive sprockets is rotated by a motor and gear box (not shown) to drive the belt in a direction of travel 28.

Figure 2:
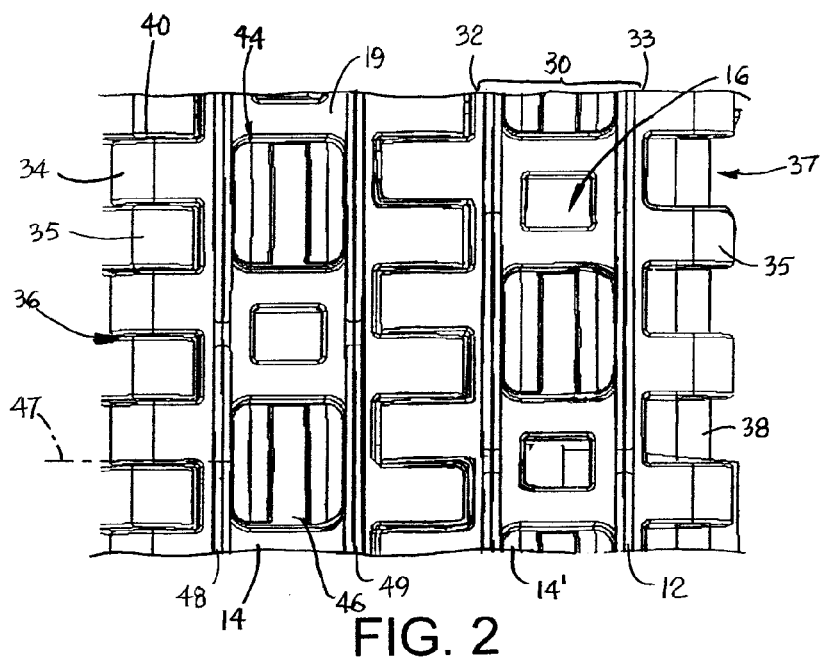
FIG. 2 is a top plan view of a portion of the conveyor belt of FIG. 1.

As shown in FIG. 2, each module 12 has an intermediate portion 30 that extends from a first end 32 to an opposite second end 33 defining the length of the module. The module extends in width from a first side edge 42 to an opposite second side edge 43. The thickness of the module is measured from the bottom side 18 to an opposite top side 19. Hinge elements of a first set 34 are spaced apart laterally along the first end 32, and hinge elements of a second set 35 are spaced apart laterally along the second end 33. First and second gaps 36, 37 between the hinge elements of the first and second sets 34, 35 are sized to allow the first set of hinge elements of one row to interleave with the second set of hinge elements of an adjacent row. Hinge pins 38 through aligned openings 39 in the interleaved hinge elements connect adjacent rows together at hinge joints 40 in the endless belt 10.

Each belt module 12 has one or more cavities 44 that open onto the top side 19 of the module. In the version of module shown in FIG. 2, the cavities also open onto the bottom side 18 and are alternately positioned across the width of the intermediate portion with the drive pockets 16, which are shown opening onto the top side 19, too. A belt roller 46 is mounted in each cavity for rotation on an axis 47 parallel to the length of the intermediate portion. The rollers 46 on one row 14 are shown offset in the width direction from those in an adjacent row 14' for more even article support. The lateral offset from row to row means that the drive pockets 16 are also laterally offset from row to row. The laterally offset and circumferentially staggered groups of teeth 20, 21 on the sprockets accommodate the offset roller arrangement. Salient portions of the rollers 46 extend above the top side 19 of the belt into a supporting position for conveyed articles.

First and second parallel ridges 48, 49 extend laterally across the width of the module along the first and second ends 32, 33. The ridges increase the module's beam stiffness. The ridges shown are wavy, their height above the top side varying across the width of the module. The height of the ridges is at a maximum at the position of the roller cavities 44. But the peak of the ridges is below the tops of the rollers. The height of the ridges decreases to a minimum midway between cavity positions in the module. In this way, the bottoms of conveyed articles are guaranteed to ride atop the rollers, and trip points on the ridges are minimized.

Figure 3:
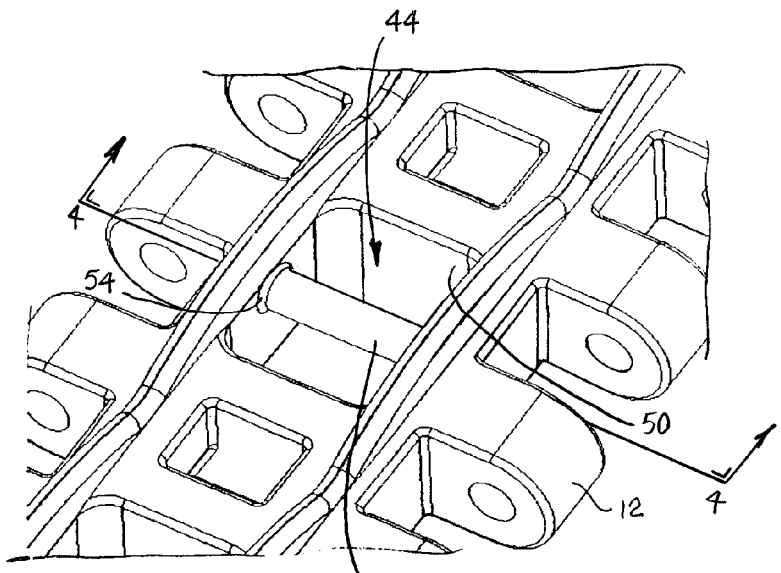
FIG. 3 is an enlarged isometric view of the top surface of a module of a conveyor belt as in FIG. 1.
Figure 4:
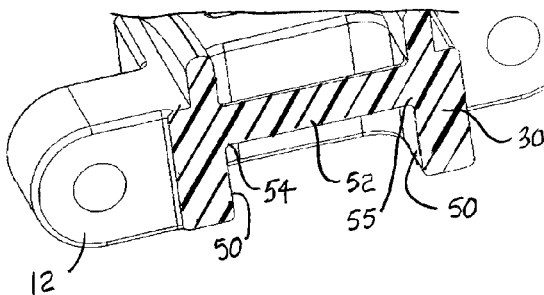
FIG. 4 is an axonometric cross section of the module of FIG. 3 taken along lines 4-4.

A portion of the belt module 12 without a roller is shown in FIG. 3. The roller cavity 44 in the intermediate portion 30 is bounded by a perimetric wall 50. An axle 52 for the rollers extends diametrically across the cavity. The ends 54 of the axle terminate at opposite positions on the wall. As shown in cross section in FIG. 4, the axle 52 is formed unitarily with the intermediate portion 30 of the module 12, its ends 54, 55 continuous with the wall 50 and the rest of the module. In this example, the axle's axis (47, FIG. 2) is parallel to the length of the intermediate portion 30 so that the roller rotates transverse to the direction of travel. But the axle 52 could be formed in the cavity at other angles, such as with its axis of rotation parallel to the width of the direction of the intermediate portion to rotate in or opposite to the direction of travel.

Figure 9:
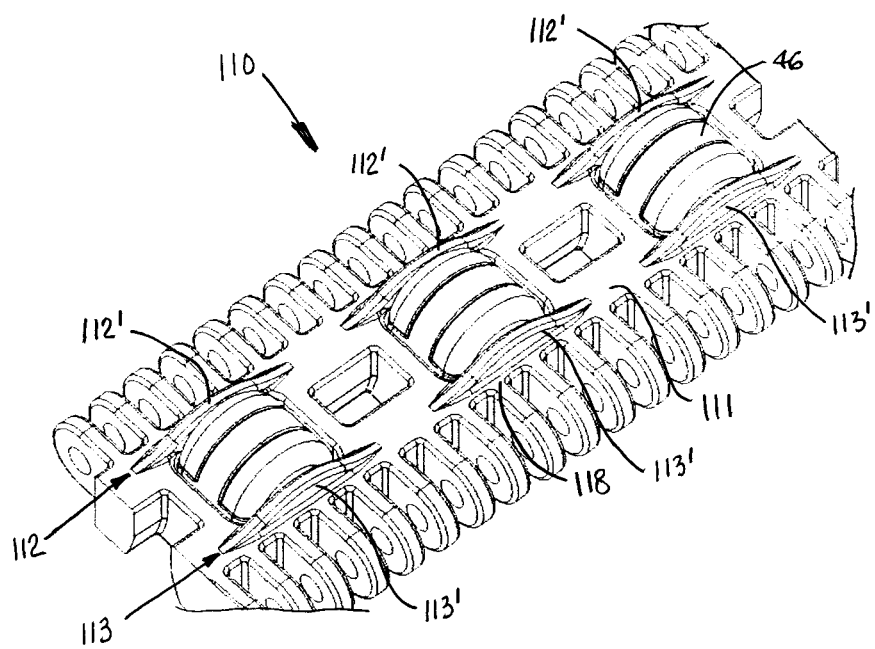
FIG. 9 is an isometric view from the top side of a portion of another version of conveyor belt module usable to make a conveyor belt as in claims 1.
Figure 10:
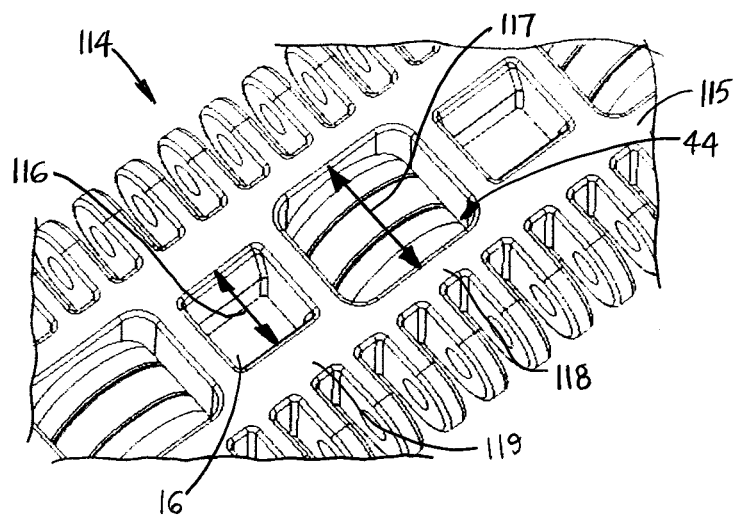
FIG. 10 is an isometric view of a portion of the bottom side of the conveyor belt module of FIG. 9.

Another version of a conveyor belt module that can be used to construct stiff roller-top belts is shown in FIGS. 9 and 10 from the top and bottom sides. The conveyor belt module 110, which is similar to the belt module 12 of FIG. 3, has on its top side 111 first and second ridges 112, 113 that are segmented across the width of the intermediate portion of the module into individual ridge segments 112', 113' whose maximum heights coincide with the positions of the rollers 46. As seen from the bottom side 115 of the module in FIG. 10, the length dimension 116 of the drive pockets 16 is less than the length dimension 117 of the roller cavities 44, which means that the beam portions 118 between the hinge elements and the cavities are thinner than the beam portions 119 between the hinge elements and the drive pockets 16. The ridge segments 112', 113' on the top side of the thinner beam portions 118 add stiffness to those thinner portions.

Figure 8:
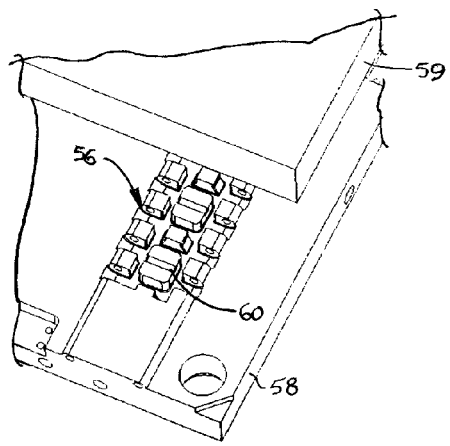
FIG. 8 is an isometric view of a mold for a conveyor belt module as in FIG. 3.

One way of manufacturing the module is shown in FIG. 8. A molten thermoplastic polymer, such as polypropylene, polyethylene, acetyl, or a composite polymer, is injected into a cavity region 56 of a closed mold consisting of two mold halves 58, 59 (shown separated). (The axle and cavity portion 60 of one half of the mold is shown in FIG. 8.) Once the mold cavity is filled, heat and pressure are applied to the joined mold halves to mold the module. The mold halves are parted and the molded module ejected. In this way, the axle is molded unitarily with the intermediate portion of the module.

Figure 5A:
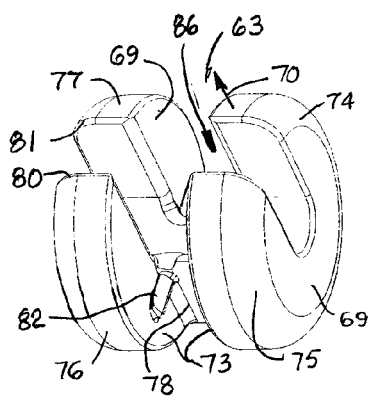
FIGS. 5A-5C are oblique views of a first roller piece, a second roller piece, and a complete roller usable in a conveyor belt module as in FIG. 3.
Figure 5B:
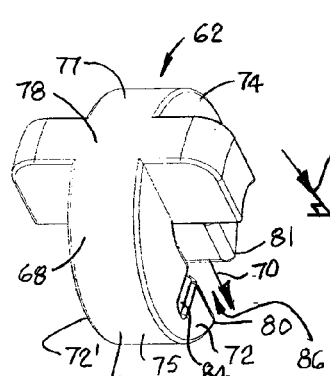
Figure 5C:
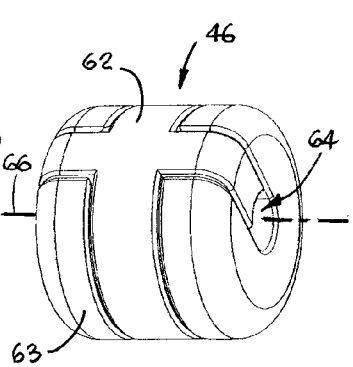

Because the axles 52 are unitarily molded with the modules and both ends 54, 55 of the axles are continuous with the walls 50, the belt rollers 46 cannot be axially inserted onto the axles. FIGS. 5A-5C show one version of a multi-piece roller 46. The roller consists of two different pieces: a first roller section 62 and a second roller section 63. The two sections are inserted radially onto the axle and joined together like three-dimensional puzzle pieces. When joined, the two roller sections form the complete roller 46 with a central bore 64 along a central axis 66 of the roller. The first roller section 62 has a first interdigitating member 68 that interdigitates with a pair of second interdigitating members 69 on the second roller section 63 to form the complete roller 46. The complete roller is assembled by sliding the two roller sections 62, 63 together in a radial direction 70 perpendicular to the central axis 66.

Each of the interdigitating members 68, 69 has a lateral face 72 in contact with a lateral face 73 of an adjacent interdigitated member. In this example, the outward facing lateral faces 72, 72' of the first roller section 62 contact the inward-facing lateral faces 73 of the second roller section 63. The axially overlapped faces prevent axial separation of the two interdigitated roller sections. Each of the interdigitating members 68, 69 has a pair of fingers 74, 75 on opposite sides of the bore 64. Each finger 74, 75 forms a portion 76, 77 of the outer periphery of the complete roller 46. The fingers extend from a cap member 78 out to distal ends 80, 81. Like the fingers, the cap members form a portion of the periphery of the complete roller. The interdigitated roller sections are retained together by locking means in the form of locking ears 82 formed on the lateral faces 73 of the second roller section 63 in cooperation with matching detents 84 formed in the lateral faces 72, 72' of the first roller section 62. The ears snap in place in the detents to lock the roller on the axle and prevent it from radially separating in operation. The first and second roller sections 62, 63 surround less than 360° of the bore and form a gap 86 opening into the bore that is wide enough to admit an axle radially into the bore. In this example, the interdigitating members surround about 180° of the bore.

Figure 6A:
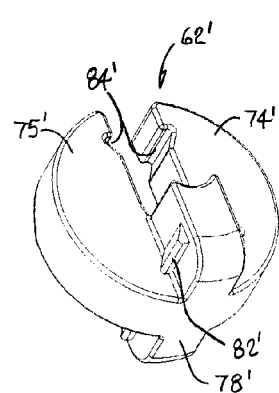
FIGS. 6A-6C are axonometric views of a first roller piece, a second roller piece, and another complete roller usable in a conveyor belt module as in FIG. 3.
Figure 6B:
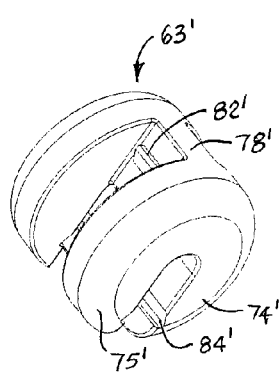
Figure 6C:
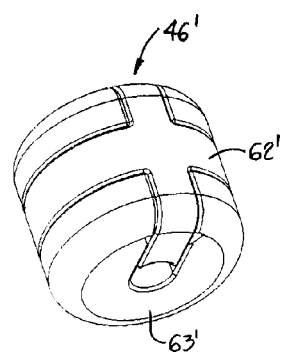

Another version of a multi-piece belt roller is shown in FIGS. 6A-6C. The complete roller 46' is externally identical to the roller 46 of FIG. 5C. The only difference is the locking means in which locking ears 82' are formed on the cap members 78' of the first and second roller sections 62', 63' and mating detents 84' are formed in the fingers 74', 75'.

Figure 7A:
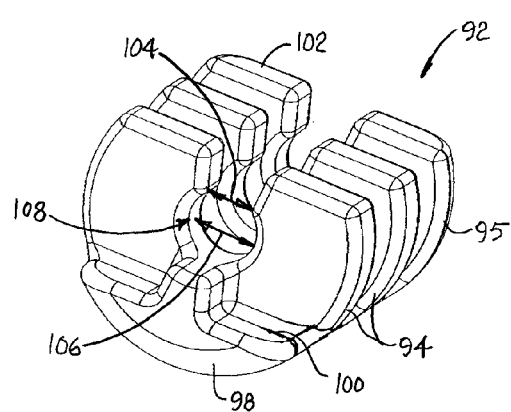
FIGS. 7A and 7B are axonometric views of a roller piece and another complete roller usable in a conveyor belt module as in FIG. 3.
Figure 7B:
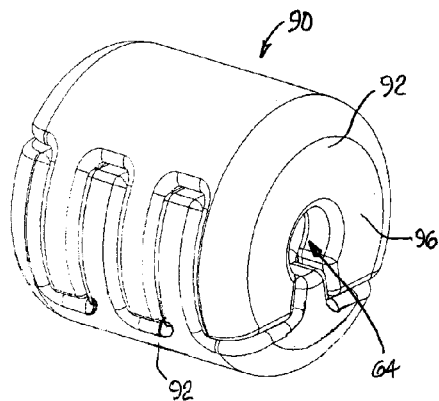

Yet another version of a multi-piece roller that is usable in a conveyor belt as in FIG. 1 is shown in FIGS. 7A and 7B. In this version, the complete roller 90 consists of two identical roller sections 92. Each roller section in this example has three interdigitating members: two internal members 94 and an end member 95. The interdigitating members are identical except that the end member 95 has a rounded outer face 96 that forms an end of the complete roller 90. Like the rollers of FIGS. 5 and 6, the roller 90 has a cap portion 98 that forms a portion of the outer periphery of the roller across its entire axial length. The interdigitating members 92, 93 extend from a flat base 100 of the cap member 98 to flat distal ends 102. When the complete roller is assembled as in FIG. 7B, the flat distal ends of the interdigitating members rest on the flat base of the cap member of the other roller section. Because the cap members are opposite each other, they help prevent impulse or shock loads from separating the roller sections. The interdigitating members 94, 95 of each roller section 92 in this roller surround more than 180° of the bore 64. Unlike the rollers of FIGS. 5 and 6, the roller 90 has gaps 104 leading into the bore 64 that, at their narrowest, are narrower than the bore's diameter 106. The restricted opening into the bore portion 108 allows each roller section to snap onto an axle whose diameter is slightly greater than the width of the gaps 104.

Other locking means for locking the two roller sections together include adhesive-bonding, sonic welding, and other conventional mechanical and chemical fastening techniques. Furthermore, each of the roller sections could be molded out of more than one material to provide desirable operating characteristics and a variety of outer periphery textures.

What is claimed is:

1. A conveyor belt module comprising:
  an intermediate portion having a first end and an opposite second end defining the length of the intermediate portion, a top side and an opposite bottom side defining the thickness of the intermediate portion, and a first edge and an opposite second edge defining the width of the intermediate portion;
  a first set of hinge elements spaced apart across first gaps along the first end of the intermediate portion;
  a second set of hinge elements spaced apart across second gaps along the second end of the intermediate portion;
  at least one cavity enclosed by a perimetric wall in the intermediate portion and opening onto the top side;
  an axle unitarily molded with the intermediate portion and extending across the cavity with opposite ends of the axle terminating at opposite positions on the wall;
  a roller having a bore receiving the axle for rotation of the roller on the axle.

2. A conveyor belt module as in claim 1 wherein a salient portion of the roller protrudes above the top surface.

3. A conveyor belt module as in claim 1 wherein the axle has an axis parallel to the length of the intermediate portion.

4. A conveyor belt module as in claim 1 wherein the axle has an axis parallel to the width of the intermediate portion.

5. A conveyor belt module as in claim 1 wherein the roller comprises two roller portions insertable in the cavity and onto the axle into mating relationship.

6. A conveyor belt module as in claim 1 further comprising a first ridge extending upward from the top surface along the first end of the intermediate portion between the first and second edges.

7. A conveyor belt module as in claim 6 further comprising a second ridge extending upward from the top surface and parallel to the first ridge along the second end of the intermediate portion.

8. A conveyor belt module as in claim 6 wherein the first ridge is segmented into first ridge segments across the width of the intermediate portion.

9. A conveyor belt module as in claim 8 wherein each of the first ridge segments is positioned at one of the cavities.

10. A conveyor belt module as in claim 6 wherein the height of the first ridge above the top surface varies across the width of the intermediate portion.

11. A conveyor belt module as in claim 6 wherein the height of the first ridge is a maximum at the at least one cavity.

12. A conveyor belt module as in claim 11 wherein the maximum height of the first ridge is less than the maximum height of the roller above the top surface.

13. A modular conveyor belt comprising:
  a series of rows of one or more belt modules, wherein each of the belt modules includes:
    an intermediate portion having a first end and an opposite second end defining the length of the intermediate portion, a top side and an opposite bottom side defining the thickness of the intermediate portion, and a first edge and an opposite second edge defining the width of the intermediate portion;
    a first set of hinge elements spaced apart across first gaps along the first end of the intermediate portion;
    a second set of hinge elements spaced apart across second gaps along the second end of the intermediate portion;
    a plurality of cavities, each enclosed by a perimetric wall in the intermediate portion and opening onto the top side;
    a plurality of axles unitarily molded with the intermediate portion, each extending across one of the cavities with opposite ends of the axles terminating at opposite positions on the wall;
    a plurality of rollers, each having a bore receiving one of the axles for rotation of the roller on the axle;
  wherein the first set of hinge elements of the belt modules along the rows interleave and connect with the second sets of hinge elements of one of the adjacent rows to form hinge joints connecting adjacent rows.

14. A modular conveyor belt as in claim 13 wherein each axle in each conveyor belt module has an axis parallel to the length of the intermediate portion.

15. A modular conveyor belt as in claim 13 wherein each axle in each conveyor belt module has an axis parallel to the width of the intermediate portion.

16. A modular conveyor belt as in claim 13 wherein each roller comprises two roller portions insertable in the cavity and onto the axle into mating relationship.

17. A modular conveyor belt as in claim 13 wherein each conveyor belt module further includes a first ridge extending upward from the top surface along the first end of the intermediate portion between the first and second edges.

18. A modular conveyor belt as in claim 17 wherein each conveyor belt module further includes a second ridge extending upward from the top surface and parallel to the first ridge along the second end of the intermediate portion.

19. A modular conveyor belt as in claim 17 wherein the height of the first ridge above the top surface varies across the width of the intermediate portion.

20. A modular conveyor belt as in claim 17 wherein the height of the first ridge is a maximum at the cavities.

21. A modular conveyor belt as in claim 20 wherein the maximum height of the first ridge is less than the maximum height of the rollers above the top surface.

22. A modular conveyor belt as in claim 17 wherein the first ridge is segmented into first ridge segments across the width of the intermediate portion.

23. A modular conveyor belt as in claim 13 wherein the rollers in adjacent rows are offset in the width direction.

24. A modular conveyor belt as in claim 13 wherein each of the belt modules further includes a plurality of drive pockets opening onto the bottom side of the intermediate portion and alternately disposed across the width of the intermediate portion with the cavities, wherein the drive pockets of adjacent rows of belt modules are laterally offset from each other.

25. A conveyor comprising a conveyor belt as in claim 24 and a sprocket having a first group of peripheral teeth laterally offset from a second group of peripheral teeth, wherein the first group is circumferentially staggered from the second group to engage the laterally offset drive pockets in the modular conveyor belt.

26. A conveyor belt module comprising:
   an intermediate portion having a first end and an opposite second end defining the length of the intermediate portion, a top side and an opposite bottom side defining the thickness of the intermediate portion, and a first edge and an opposite second edge defining the width of the intermediate portion;
   a first set of hinge elements spaced apart across first gaps along the first end of the intermediate portion;
   a second set of hinge elements spaced apart across second gaps along the second end of the intermediate portion;
   a first ridge extending upward from the top surface along the first end of the intermediate portion between the first and second edges, wherein the height of the first ridge above the top surface varies across the width of the intermediate portion and is nonzero over the majority of the width of the intermediate portion to increase the beam stiffness of the conveyor belt module.

27. A conveyor belt module as in claim 26 further comprising a second ridge extending upward from the top surface and parallel to the first ridge along the second end of the intermediate portion.

28. A modular conveyor belt comprising:
   a series of rows of one or more belt modules, wherein each of the belt modules includes:
      an intermediate portion having a first end and an opposite second end defining the length of the intermediate portion, a top side and an opposite bottom side defining the thickness of the intermediate portion, and a first edge and an opposite second edge defining the width of the intermediate portion;
      a first set of hinge elements spaced apart across first gaps along the first end of the intermediate portion;
      a second set of hinge elements spaced apart across second gaps along the second end of the intermediate portion;
      a first ridge extending upward from the top surface along the first end of the intermediate portion between the first and second edges, wherein the height of the first ridge above the top surface varies across the width of the intermediate portion and is nonzero over the majority of the width of the intermediate portion to increase the beam stiffness of the conveyor belt;
   wherein the first set of hinge elements of the belt modules along the rows interleave and connect with the second sets of hinge elements of one of the adjacent rows to form hinge joints connecting adjacent rows.

29. A conveyor belt module as in claim 28 wherein each of the belt modules further includes a second ridge extending upward from the top surface and parallel to the first ridge along the second end of the intermediate portion.

* * * * *